United States Patent [19]

Labate

[11] 4,289,804

[45] Sep. 15, 1981

[54] PROCESS FOR TREATING METAL HANDLING AND SHAPING DEVICES

[76] Inventor: Micheal D. Labate, 115 Hazen Ave., Ellwood City, Pa. 16117

[21] Appl. No.: 177,650

[22] Filed: Aug. 13, 1980

Related U.S. Application Data

[63] Continuation-in-part of Ser. No. 59,968, Jul. 23, 1979, abandoned.

[51] Int. Cl.³ .................. B44D 1/092; B22D 41/00
[52] U.S. Cl. ............................ 427/135; 427/318; 427/421; 106/307
[58] Field of Search ................ 427/135, 318, 421; 106/307

[56] References Cited

U.S. PATENT DOCUMENTS 2,245,747  6/1941  Barr ............................... 427/135
2,246,463  6/1941  Garratt ........................... 427/318
4,098,929  7/1978  Badone et al. ................. 427/135

FOREIGN PATENT DOCUMENTS 251401   5/1964  Australia ........................ 427/135
785823  11/1957  United Kingdom ............ 427/135
1198363  7/1970  United Kingdom ............ 427/135

Primary Examiner—Ralph S. Kendall
Attorney, Agent, or Firm—Webster B. Harpman

[57] ABSTRACT

A process and material for treating metal handling and shaping devies with a material containing sub micron sized particles of graphite in a liquid carrier is described that forms a penetraring and lubricating coating on the metal handling and shaping devices so as to maintain a smooth surface condition capable of resisting adhesion of contaminates thereto and the build up of foreign materials thereon.

10 Claims, No Drawings

PROCESS FOR TREATING METAL HANDLING AND SHAPING DEVICES

This is a continuation in part of Ser. No. 59,968, filed July 23, 1979, abandoned.

BACKGROUND OF THE INVENTION (1) Field of the Invention:

This invention relates to a process and material for treating metal handling and shaping devices such as steel forging dies and ingot molds.

(2) Description of the Prior Art:

The present invention relates to a process and material for building up a penetrating coating on forging dies and the like with a material that is not affected by the heat of the metal shaping operation and to which foreign materials will not adhere. The material used in the process forms a penetrating lubricating adhesive coating on the metal handling devices.

The prior art comprises my U.S. Pat. Nos. 4,187,334 and 4,187,335, issued Feb. 5, 1980.

SUMMARY OF THE INVENTION

A process and material for treating metal handling and shaping device comprises the coating of the devices as by spraying or other application of a material which is essentially sub micron sized particles of graphite in an improved liquid carrier of the extremely fine size of the submicron sized particles of graphite which lowers the surface tension of the liquid carrier and enables the graphite particles to penetrate the metal surfaces of the devices and build up a smooth adhering coating thereover. The liquid carrier comprises water, an aqueous sodium silicate solution and hydrochloric acid, a water soluable resin of the carboxyl group of carboxylic acids, either COOH or $CO_2H$ and/or composed of a carboxyl group and a hydroxyl group, ("carboxyl; oxatyl, carboxy, the acidic COOH group, it determines the basicity of an organic acid"), such as carboxy polymethylene polymers as a dry fluffy acid powder which is power mixed with the submicron sized graphite particles and the liquid carrier to obtain a suitable hydrogen bonding in the solution.

DESCRIPTION OF THE PREFERRED EMBODIMENT

The material of this invention is particularly suitable for building up penetrating and lubricating adhesive coatings on metal handling and shaping devices and comprises between about 5% to 25% by weight submicron sized particles of graphite, between about 34% to 75% of a solution of water and sodium silicate ($Na_2Si_3O_7$), wherein the sodium silicate is present at about 40% of the solution, between about 2% to 10% concentrated hydrochloric acid of a 90% purity by weight, between about 33% to 75% of a solution of water and a carboxy polymethylene polymer resin wherein the resin is present in amounts between 1% to 10% of the solution by weight, and between about 15% to 20% water by weight.

The critical particle size of the submicron sized graphite particles being substantially amicron; less than 5 m$\mu$ or $10^{-7}$ cm as determined by electron microscopy. The submicron sized graphite particles are made by ball milling the finest mesh colloidal graphite particles commercially available for a time sufficient to obtain the desired sub micron graphite particle size which eliminates the platelets. The carboxy polymethylene polymer resin powder has a specific gravity of 1.41 and a bulk density of 13 lbs. per cubic foot. It is available as "CARBOPOL" from B. F. Goodrich Chemical Co. and low concentrations mixed with water as herein disclosed produce a thin gel-like liquid with penetrating and adhesive qualities.

The liquid carrier as set forth hereinbefore comprises an effective wetting agent which contributes to the ability of the sub micron sized particles of graphite to penetrate the metal of the metal handling and shaping devices.

The lower percentages of the submicron sized particles of graphite in the liquid carrier perform most effectively when a number of applications of the material are applied and when only one or a few applications of the materials are applied to the metal surfaces, higher percentages of the submicron sized particles of graphite are more desirable.

In either case the critical particle size of the graphite in the material penetrates the metal surfaces being treated and builds up an extremely smooth, slick coating to which the metal being handled or shaped will not adhere.

In using the material disclosed herein, the process involves mixing the materials to form a liquid suspension of the submicron sized particles of graphite and then spraying the same by any suitable spraying equipment on cleaned metal surfaces of the metal handling and shaping devices to be treated. One or more coatings are applied as necessary to build up a smooth unbroken surface of the material on the metal devices being treated and the material may be applied to the metal surfaces while they are either hot or cold.

Ingot molds are advantageously treated with the material of the invention and such treatment expedites the stripping of ingots from the molds.

The following specific examples of the material have been found satisfactory:

A. Substantially 8% by weight submicron sized particles of high purity synthetic graphite, substantially 7% by weight concentrated hydrochloric acid of substantially 90% purity, substantially 18% by weight water ($H_2O$), substantially 34% by weight aqueous sodium silicate solution wherein the $Na_2Si_3O_7$ is present at about 40% by weight of the solution and substantially 33% by weight water soluable carboxy polymethylene polymer resin as a powder wherein the resin is present at substantially 8% by weight of the solution.

B. Substantially 8% by weight submicron sized particles of high purity synthetic graphite, substantially 7% by weight concentrated hydrochloric acid of substantially 90% purity, substantially 18% by weight water ($H_2O$), substantially 67% by weight aqueous sodium silicate solution wherein the $Na_2Si_3O_7$ is present at about 40% by weight of the solution.

C. Substantially 8% by weight submicron sized particles of high purity synthetic graphite, substantially 7% by weight concentrated hydrochloric acid of substantially 90% purity, substantially 18% by weight water ($H_2O$), substantially 67% by weight aqueous solution of carboxy polymethylene polymer resin as a powder wherein the resin is present at substantially 8% by weight of the aqueous solution of carboxy polymethylene polymer resin as a powder wherein the resin is present at substantially 8% by weight of the aqueous solution.

An alternate liquid carrier has been found to produce a suitable suspension of the submicron sized particles of graphite and substitutes xanthan gum for the resin, the gum is a natural high molecular weight linear polysaccharide, functioning as a hydrophilic colloid to maintain the submicron sized particles of graphite in suspension and contribute to the penetrating lubricating adhesive coating as described hereinbefore.

A specific example of such an alternate material follows:

D. Substantially 8% by weight submicron sized particles of high purity synthetic graphite, substantially 7% by weight concentrated hydrochloric acid of substantially 90% purity, substantially 18% by weight water ($H_2O$), substantially 67% by weight aqueous solution of xanthan gum as a powder wherein the gum is present at substantially 8% by weight of the aqueous solution.

Variations in the amounts of xanthan gum may be used as from 1% to 19% of the aqueous solution.

The treatment of ingot molds hereinbefore referred to by the process and with the material disclosed herein obtains the desired results by reason of the very fine sized graphite of the material and the manner of the application. Specifically it is known in the art that molten steel in an ingot mold takes carbon from the metal of the ingot mold thereby adversely affecting the interior of the mold by removing the portions thereof and it is also known that when this occurs the stripping of the cooled ingot from the mold becomes more difficult because of the interlock obtained between the solidified metal and the irregular surface of the mold. By heating an ingot mold the grain structure enlarges and the porosity of the metal increases and in the present process the material is preferably applied to the ingot mold when it is heated as by spraying or dipping the heated mold in the liquid suspension material. Under such conditions the submicron sized particles of graphite aided by the liquid carrier penetrates the metal surfaces of the ingot mold which have been previously cleaned and build up a smooth lubricating and adhering coating which being largely graphite which is able to supply the carbon that molten steel usually absorbs from the ingot mold.

Thus the treating material is sacrificed to some degree and the inner surface of the ingot mild is retained in its desirable smooth condition. Stripping ingots from the smooth inner surface of the mold is thus considerably expedited and the molds last considerably longer as the carbon from the metal of the molds is not sacrificed as has heretofore been common in the art.

Although the embodiments of the present invention have been limited as described hereinbefore, it will be apparent to those skilled in the art that various changes and modifications may be made therein without departing from the spirit of the invention.

Having thus described my invention what I claim is:

1. A process of treating metal handling and shaping devices that consists essentially of the steps of cleaning said devices to the bare metal, penetrating a liquid suspension of submicron sized particles of graphite into said bare metal of the devices, said liquid suspension including at least 5% of 25% submicron sized particles of graphite, applying enough of said liquid suspension of graphite to build up smooth adhering and lubricating coating on said metal portions and building up sufficient excess of graphite on said devices to form a slick smooth surface, the size of said submicron particles of graphite being no larger than as determined by electron microscopy.

2. The process of claim 1 and wherein several penetrating coatings of said liquid suspension of submicron sized particles of graphite are applied to said metal devices successively.

3. The process of claim 1 and wherein several penetrating coatings of said liquid suspension of submicron sized particles of graphite are sprayed on said metal devices successively.

4. The process of treating metal handling and shaping devices set forth in claim 1 and wherein the devices are heated to a temperature of which the grain structure expands and the porosity of the metal increases and wherein the liquid suspension of submicron sized particles of graphite is applied to the heated device.

5. The process of claim 1 and wherein the liquid suspension includes sodium silicate.

6. The process of claim 1 and wherein the liquid suspension includes a water soluble resin of the carboxyl group of carboxylic acids.

7. The process of claim 1 and wherein the liquid suspension includes carboxy polymethylene polymer resin and sodium silicate.

8. The process of claim 1 and wherein the liquid suspension includes xanthan gum and sodium silicate.

9. The process of claim 1 and wherein the liquid suspension includes xanthan gum and carboxy polymethylene resin.

10. The process of claim 1 and wherein the liquid suspension includes xanthan gum.

* * * * *

UNITED STATES PATENT AND TRADEMARK OFFICE
CERTIFICATE OF CORRECTION

PATENT NO. : 4,289,804

DATED : September 15, 1981

INVENTOR(S) : Micheal D. LaBate

It is certified that error appears in the above—identified patent and that said Letters Patent is hereby corrected as shown below:

Claim 1 should read as follows:

-- 1. A process of treating metal handling and shaping devices that consists essentially of the steps of cleaning said devices to the bare metal, penetrating a liquid suspension of submicron sized particles of graphite into said bare metal of the devices, said liquid suspension including at least 5% to 25% submicron sized particles of graphite, applying enough of said liquid suspension of graphite to build up smooth adhering and lubricating coating on said metal devices and building up sufficient excess of graphite on said devices to form a slick smooth surface, the size of said submicron particles of graphite being no larger than 5mu as determined by electron microscopy. --

Signed and Sealed this

Twenty-third Day of February 1982

[SEAL]

Attest:

GERALD J. MOSSINGHOFF

Attesting Officer

Commissioner of Patents and Trademarks